US012450118B2

(12) United States Patent
Weiss et al.

(10) Patent No.: US 12,450,118 B2
(45) Date of Patent: Oct. 21, 2025

(54) AUTOMATICALLY DETECTING AND CORRECTING MEMORY ERRORS IN A SECURE MULTI-CHANNEL COMPUTER

(71) Applicant: Siemens Mobility GmbH, Munich (DE)

(72) Inventors: Nils Weiss, Braunschweig (DE); Alexander Priebe, Braunschweig (DE); Wolfgang Ebeling, Remlingen (DE)

(73) Assignee: Siemens Mobility GmbH, Munich (DE)

( * ) Notice: Subject to any disclaimer, the term of this patent is extended or adjusted under 35 U.S.C. 154(b) by 39 days.

(21) Appl. No.: 18/684,913

(22) PCT Filed: Jul. 29, 2022

(86) PCT No.: PCT/EP2022/071326
§ 371 (c)(1),
(2) Date: Feb. 20, 2024

(87) PCT Pub. No.: WO2023/020807
PCT Pub. Date: Feb. 23, 2023

(65) Prior Publication Data
US 2025/0130888 A1   Apr. 24, 2025

(30) Foreign Application Priority Data
Aug. 18, 2021 (DE) ............... 10 2021 209 038.9

(51) Int. Cl.
*G06F 11/00* (2006.01)
*G06F 11/10* (2006.01)
(52) U.S. Cl.
CPC .................. *G06F 11/10* (2013.01)

(58) Field of Classification Search
CPC ..................................... G06F 11/10
See application file for complete search history.

(56) References Cited

FOREIGN PATENT DOCUMENTS

| CN | 110519116 B | * | 1/2021 | .......... H04L 1/0061 |
| DE | 102004035901 A1 | | 3/2006 | |
| EP | 3448735 B1 | | 4/2020 | |
| WO | WO 2006120165 A1 | | 11/2006 | |

OTHER PUBLICATIONS

Brauer, H.: "Sicheres Mikrorechnersystem LOGISIRE"; Signal und Draht: Signalling & Datacommunication, Eurailpress, DE; pp. 35-41.

* cited by examiner

*Primary Examiner* — Amine Riad
(74) *Attorney, Agent, or Firm* — Laurence A. Greenberg; Werner H. Stemer; Ralph E. Locher

(57) ABSTRACT

A method for automatically detecting and correcting memory errors in a secure multichannel railway computer provides each channel with at least one memory and the same data stored in parallel in the memories. A first check value is calculated for data in a subregion of the first memory and a second check value is calculated for the same data in a subregion of the second memory. First and second check values are compared and if different, first and/or second check values are compared with an old check value. Data in the subregion of the first memory are replaced by data in the subregion of the second memory if the second check value corresponds to the old check value. Data in the subregion of the second memory are replaced by data in the subregion of the first memory if the first check value corresponds to the old check value.

11 Claims, 2 Drawing Sheets

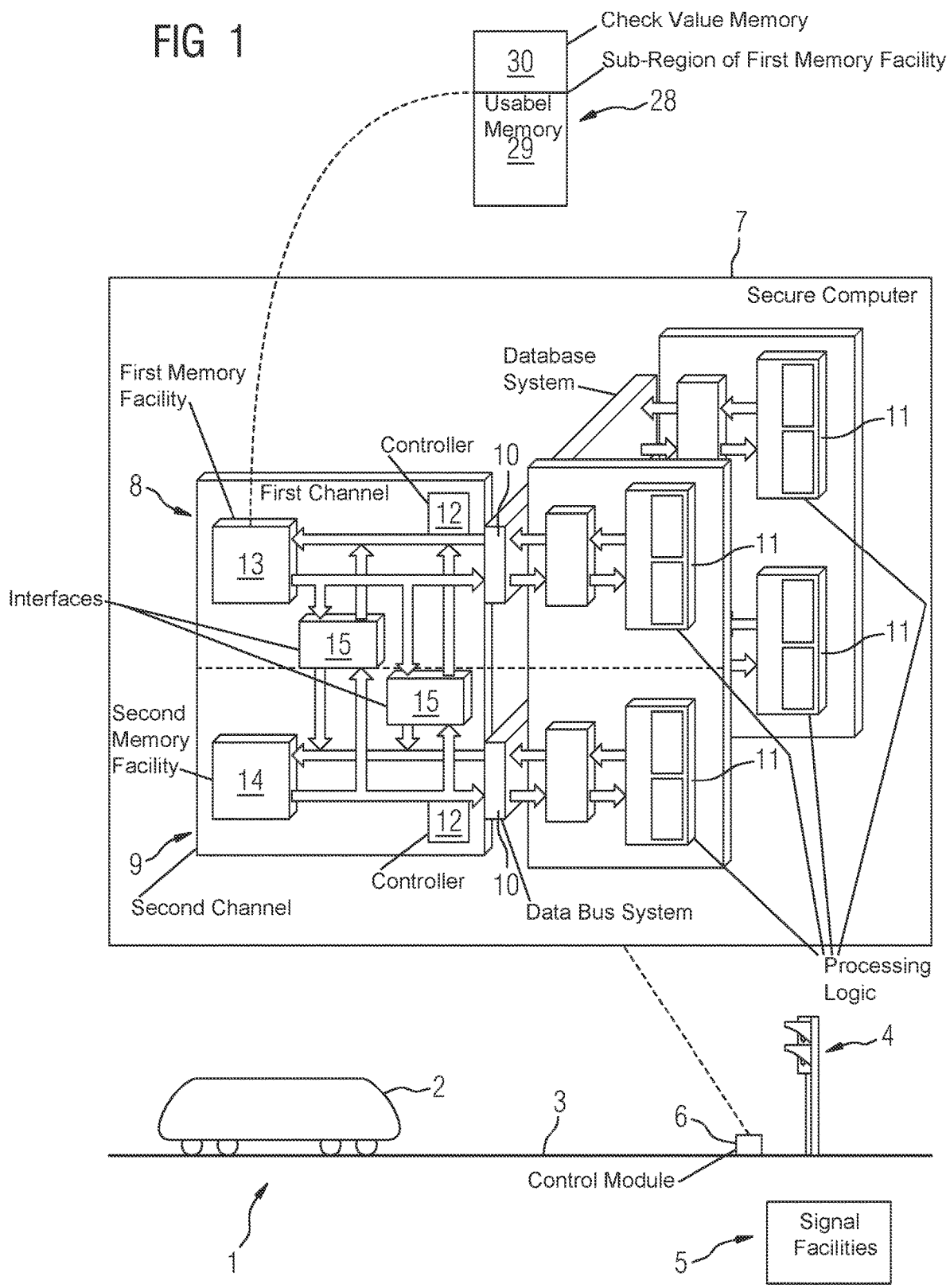

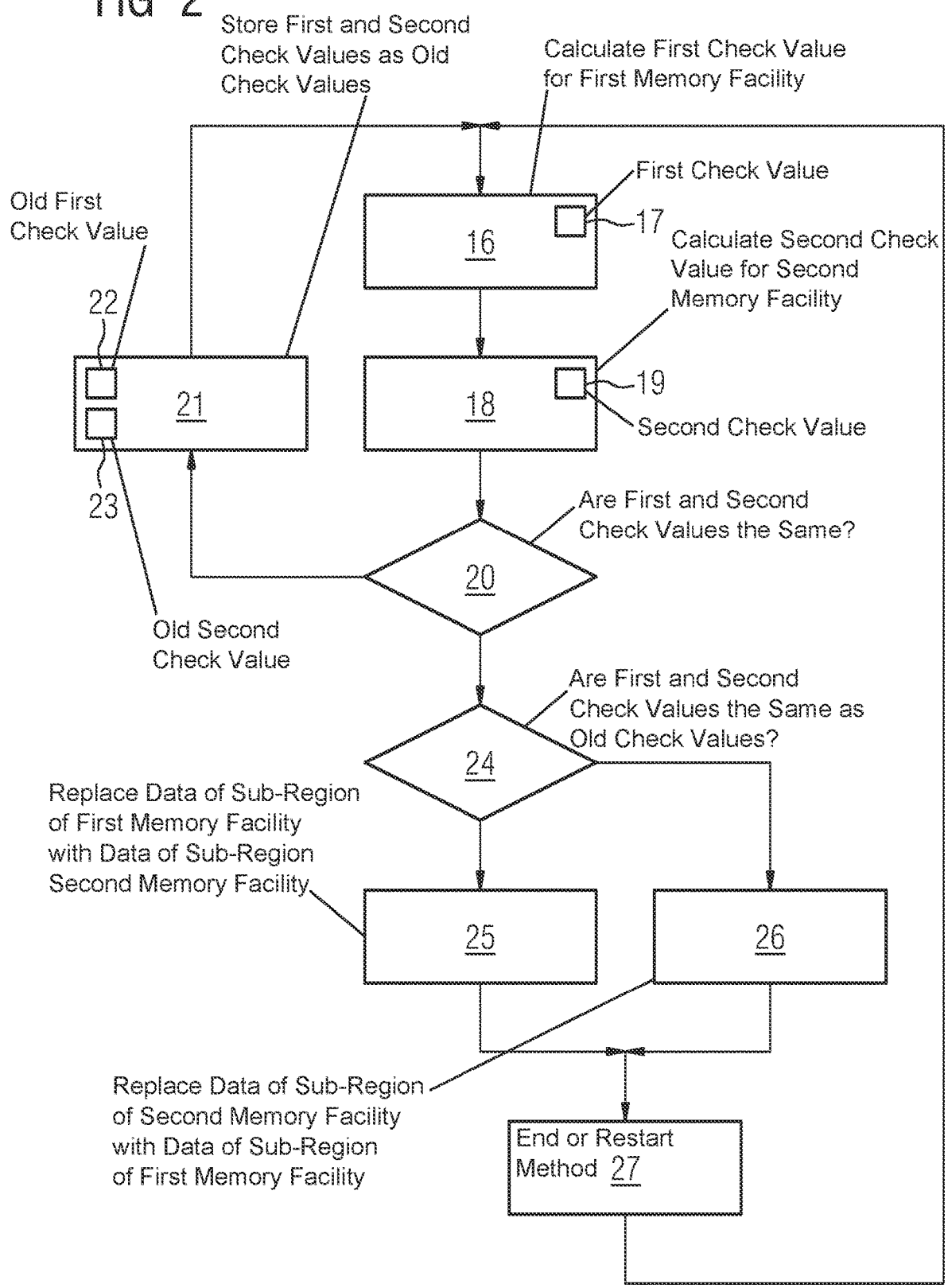

AUTOMATICALLY DETECTING AND CORRECTING MEMORY ERRORS IN A SECURE MULTI-CHANNEL COMPUTER

FIELD AND BACKGROUND OF THE INVENTION

The invention relates to a method for automatically detecting and correcting memory errors in a secure multi-channel computer of a railway system, each channel of the computer having at least one memory facility (also referred to as storage facility) and data being stored in parallel in the memory facilities of the channels.

In railway systems, a high level of safety is required because otherwise major hazards may arise, for example, for passengers or other persons involved. For many processes, such as for example, in the interlocking area, high Safety Integrity Levels-SIL such as, for example, SIL 3 or SIL 4 are therefore required according to applicable standards. The computers which are often in use today, which control the processes of the railway system, are therefore often what are known as secure computers. The term secure computer refers, for example, to special industrial computers which have sufficient error disclosure through redundant execution and thereby meet the necessary safety requirements. DE 10 2004 035 901 A1, for example, describes such a secure computer.

Randomly occurring memory errors, which can be triggered, for example, by external influences, such as, for example, soft errors or by a lack of signal-to-noise ratios in the memory components, can lead to malfunctions of electrical devices and are problematic in the safety-related environment of a railway system. Such random memory errors as bit flips occur statistically everywhere in the memory facilities used, for example RAM memories, regardless of the use of memory facilities. Therefore, these memory errors can occur both in the case of highly dynamic data contents, constant data contents and in unused memory areas. Such memory errors referred to here are not motivated by defects in the memory components. The random memory errors described are, of course, already taken into account in the design of a railway system and are typically disclosed by the comparison of two independent memory facilities in different channels of a computer. Usually, a memory error detected in this way leads to the shutdown of the system because it is not readily known which channel has the correct data. This shutdown, however, leads to a minimization of the availability of such a two-by-two system.

Solutions are also known which solve this problem by means of additional hardware. Thus, for example, shadow memory or so-called ECC memory (Error Correcting Code) can be used. These are described and read out or evaluated with each memory access in addition to the data in additional memory bits, so that an error can be detected and corrected.

SUMMARY OF THE INVENTION

It is the object of the present invention to provide an aforementioned method for automatically detecting and correcting memory errors which does not require any additional hardware and nevertheless meets the highest safety requirements.

For the aforementioned method, the object is achieved in that a first check value is calculated for data in a sub-region of the first memory facility,
  a second check value is calculated for the same data in a sub-region of the second memory facility,
  the first and the second check value are compared with one another;
  if the first and the second check value are different, the first check value and/or the second check value are compared with an old check value;
  the data in the sub-region of the first memory facility is replaced by the data in the sub-region of the second memory facility if the second check value corresponds to the old check value; and
  the data in the sub-region of the second memory facility is replaced by the data in the sub-region of the first memory facility if the first check value corresponds to the old check value.

The advantage of the solution according to the invention is that the method can be implemented in a purely software-based manner and only limited hardware is required. The method according to the invention is particularly suitable in two-by-two systems, that is to say in secure computers with exactly two redundant channels.

In this case, the first check value for the data of a sub-region of the first memory facility is calculated. A check value is understood here to mean, for example, a hash value or a checksum which are calculated via the stored data. In principle, any type of checksum can be used. However, it is advantageous that the checksum converges towards a residual error probability regardless of the amount of data. The first memory facility is located in a first channel of the secure computer. In addition, the second check value is calculated for the data of the corresponding sub-region of the second memory facility. In these sub-regions of the first and second memory facility, the same data is stored redundantly in an error-free state.

Subsequently, the first and second check values are compared with one another. If there are no memory errors, the check values should be the same. However, if the first and second check value are different, according to the invention the first check value and/or the second check value are compared with the old check value. The old check value is also stored, for example, in the memory facilities of each channel and was calculated at an earlier time.

The old check value is the same as the first and second check values at the earlier time, which were recognized as belonging to non-falsified data. Thus, if no data has been changed, due to deliberate modification or memory error, the first and second check values based on uncorrupted data must match the old check value. Hereinafter, reference is made in part to erroneous check values. This means check values based on falsified data. In themselves, these so-called false check values are calculated completely correctly from the data on which they are based. Only the underlying data is corrupted and therefore false. By comparing it with the old check value, it is possible according to the invention to identify in a very simple manner in which memory facility the memory error is present and the data needs to be replaced.

As a result, the data in the sub-region of the first memory facility is replaced by the data in the sub-region of the second memory facility if the second check value corresponds to the old check value. On the other hand, the data in the sub-region of the second memory facility is replaced by the data in the sub-region of the first memory facility if the first check value corresponds to the old check value. Only one old check value is used, although, of course, one old first check value and one old second check value were originally present. However, as these have been recognized as being based on correct data, they are the same and can therefore be stored and used as a single old check value.

The method according to the invention is characterized in that it can be realized purely by software and that it can be carried out independently of the application, for example by means of an operating system background process.

The solution according to the invention can be developed by advantageous embodiments which are described hereinafter.

Thus, the check values can be determined by means of a cyclic redundancy check-CRC, in particular, CRC32, or by means of hash calculation. CRC here stands for Cyclic Redundancy Check. This known method is particularly suitable here because it reliably confirms the integrity of data and can be carried out easily. Proper CRC algorithms are advantageous here because their checksum converges towards a residual error probability regardless of the amount of data. CRC32 is the 32-bit version, which meets higher requirements and thus provides a higher level of security. The alternative hash calculation is widely used and enables efficient calculation of strong check values.

In order to be able to check the entire memory facilities quickly and easily for memory errors, the method can be carried out for a multiplicity of sub-regions of the memory facility independently of one another. This can also take place simultaneously.

Furthermore, the method can be repeated cyclically and, if the first check value and the second check value are the same in the current cycle, these can be stored as the old first check value and the old second check value for the next cycle. The advantage of this is that the memory facilities are continuously checked for memory errors and the old check values are continuously stored.

In order to minimize the probability of the check values constantly changing due to operational data changes and making error detection impossible, a memory size of the sub-regions may be less than 5%, in particular, less than 1%, of the available memory size of the memory facilities. The aim is to keep the memory size sufficiently small. It is advantageous here to divide the memory facilities into as many, relatively small sub-regions as possible, in each of which the method according to the invention is carried out. This increases the likelihood that a correction of the data will be made possible because no operational data changes took place in the sub-regions.

In order to make the memory facilities as simple as possible, the old check value can be stored in a check value memory of the first memory facility and/or in a check value memory of the second memory facility.

The invention further relates to a secure multi-channel computer for a railway system, with at least one memory facility per channel for the synchronous storage of data. According to the invention, it is provided that the computer is designed in accordance with one of the aforementioned embodiments for carrying out the method.

In an advantageous embodiment of the computer according to the invention, this can be designed as part of a signal facility of a railway system. Alternatively, the computer according to the invention can, for example, also be used in vehicles and other safety-related facilities.

Furthermore, a computer program product with program instructions for carrying out the aforementioned method according to the invention and/or its exemplary embodiments is claimed, it being possible to carry out the method according to the invention and/or its exemplary embodiments respectively by means of the computer program product.

Moreover, a provisioning apparatus for storing and/or providing the computer program product is claimed. The provisioning apparatus is, for example, a data carrier which stores and/or provides the computer program product. Alternatively and/or additionally, the provisioning apparatus is, for example, a network service, a computer system, a server system, in particular a distributed computer system, a cloud-based computer system and/or a virtual computer system, which preferably stores and/or provides the computer program product in the form of a data stream.

The provision takes place, for example, as a download in the form of a program data block and/or a command data block, preferably as a file, in particular as a download file, or as a data stream, in particular as a download data stream, of the complete computer program product. However, this provision can also take place, for example, as a partial download, which consists of a plurality of parts and in particular is downloaded via a peer-to-peer network or is provided as a data stream. Such a computer program product is read into a system, for example, using the provisioning apparatus in the form of the data carrier, and executes the program instructions, so that the method according to the invention is executed on a computer or the creation device is configured in such a way that it generates the workpiece according to the invention.

The invention is explained hereinafter with reference to the attached drawings.

BRIEF DESCRIPTION OF THE FIGURES

FIG. 1 shows a schematic view of a railway system with a secure computer according to the invention in an exemplary embodiment;

FIG. 2 shows a schematic view of an exemplary embodiment of the method according to the invention which runs on the computer in FIG. 1.

DETAILED DESCRIPTION OF THE INVENTION

An exemplary embodiment of a railway system 1 in FIG. 1 comprises vehicles 2, tracks 3, field elements 4 and signal facilities 5. For the sake of clarity, FIG. 1 shows only one example of the different components of the railway system 1 mentioned.

The field element 4 shown in FIG. 1 is here, for example, a light signal. Other field elements, such as switches, level crossings, axle counters or the like, can of course also be included. The field element 4 in FIG. 1 further comprises a control module 6, which in turn comprises a secure computer 7 and which is controlled by the control facility 5. The secure computer 7 according to the invention could alternatively or additionally also be used in other parts of the railway system, for example, the signal facility 5. In the upper part of FIG. 1, the secure computer 7 is shown enlarged.

In the exemplary embodiment in FIG. 1, the secure computer 7 is a so-called two-by-two system, that is to say, the secure computer 7 comprises a first channel 8 and a redundant second channel 9. The two channels 8, 9 are each connected to a data bus system 10, which in turn are each connected to processing logic 11 not described in greater detail. The processing logic 11 is designed to control field elements 4, such as for example, the light signal shown in FIG. 1.

The first channel 8 and the second channel 9 of the secure computer 7 each comprise a separate controller 12. Furthermore, the first channel 8 comprises a first memory facility 13 and the second channel 9 a second memory facility 14. The first channel 8 and the second channel 9 are furthermore connected to one another via interfaces 15, so that data can be exchanged and compared. The memory facilities 13, 14 are designed as RAM memory in the exemplary embodiment in FIG. 1.

In order to detect and automatically connect randomly occurring memory errors in the first memory facility 13 or the second memory facility 14, the method according to the invention shown in a schematic view in FIG. 2 and described hereinafter is carried out.

Such memory errors can be, for example, bit flips which, for example, can be triggered by external influences. The memory errors result in the redundantly stored data in the memory facilities 13, 14 no longer being completely the same and may result in an insecure state. Such memory errors can be detected and automatically corrected by means of the method according to the invention.

The memory facilities 13, 14 are each divided into many sub-regions, which are checked separately with the aid of the method according to the invention. In the exemplary embodiment in the figures, these sub-regions have, for example, a memory size of 1024 bytes, which is less than 1% of the available memory size of the memory facilities 13, 14. Other memory sizes are also possible, of course. However, relatively small sub-regions, in relation to the memory size, are advantageous because, as a result, only a few sub-regions are affected by operational data writing during ongoing operation and the remaining regions can be checked for memory errors.

In a first method step 16 shown in FIG. 2, a first check value 17 is calculated for the data of the sub-region of the first memory facility 13. A checksum or a hash value determined by a hash function can be regarded as a check value here. In the exemplary embodiment in the figures, a CRC32 checksum is used as a check value. In the next step 18, a second check value 19 is calculated for the corresponding redundant sub-region of the second memory facility 14. The sub-regions in the memory facilities 13, 14 have the same data if there is no memory error.

In the next step 20, the first check value 17 and the second check value 19 are compared with one another. In order to be able to carry out the comparison, it may be necessary to exchange the check values 17, 19 between channels 8, 9 via the interfaces 15. In the event that the first and second check values 17, 19 are the same, no memory error was detected and it is possible to proceed with step 21. In step 21, the first check value 17 is stored as the old first check value 22 and the second check value 19 is stored as the old second check value 23. As the first check value 17 and the second check value 19 are the same, only one old check value 22, 23 can be stored.

After that, the method can be started again with step 16. The method according to the invention can be run through continuously in order to be able to detect and remedy memory errors quickly after their occurrence.

However, if the comparison in step 20 reveals that the first check value 17 and the second check value 19 are different, a memory error has been detected. However, this does not yet make it clear in which of the two memory facilities 13, 14 the memory error is present. In order to detect this and to automatically correct the memory error, the method according to the invention is continued with step 24.

In step 24, the first check value 17 is compared with the stored old check value 22, 23. At the same time or alternatively, the second check value 19 is compared with the old check value 22, 23.

The old check value 22, 23 is calculated and stored from a previous test cycle in which the check values 17, 19 were the same and there were thus no memory errors.

If the second check value 19 is the same as the old check value 22, 23, this means that the data in the relevant sub-region of the second memory facility 14 is correct, i.e. there is no memory error here. In this case, the data of the sub-region of the first memory facility 13, which was consequently identified by implication as the data falsified by the memory error, is replaced by the data from the sub-region of the second memory facility 14. This is done in step 25.

However, if the first check value 17 is the same as the old check value 22, this means that the data of the first memory facility 13 is correct and has no memory errors. In this case, in step 26 the data of the sub-region of the second memory facility 14 is automatically replaced by the data of the sub-region of the first memory facility 13.

In the next step 27, the method according to the invention can be ended or restarted in step 16. Saving the old check value 22, 23 is not absolutely necessary in this case as it has not changed compared to the previous old check value.

The method described according to the invention can be carried out in parallel for many or even all the sub-regions of the memory facilities 13, 14.

FIG. 1 also shows a schematic view of a sub-region 28 of the first memory facility 13 by way of example. Of course, the representation of the sub-region 28 also applies to the sub-regions (not shown) of the second memory facility 14. Each memory facility 13, 14 comprises a multiplicity of sub-regions 28. For each sub-region 28, the method according to the invention is carried out independently of one another in the secure computer 7 as described above and shown in FIG. 2.

In the exemplary embodiment in FIG. 1, the sub-region 28 is, for example, 1024 bytes in size. In this case, the sub-region 28 comprises a usable memory 29 and a check value memory 30. The useful data is stored in the usable memory 29. Useful data includes the normal data to be stored during operation of the computer 7.

This storage of the useful data takes place, as already mentioned, redundantly in the channels 8, 9, in order to ensure the necessary security. Each sub-region 28 in the first channel 8 therefore has a sub-region 28 in the second channel 9 in which the same useful data is stored.

The old check values 22 or 23 are stored in the check value memory 30 in order to be able to use this for the method according to the invention. The advantage of this is that no other storage location is required for storage of the old check value 22, 23.

The invention claimed is:

1. A method for automatically detecting and correcting memory errors in a secure multi-channel computer of a railway system, the method comprising:
    providing each channel of the computer with at least one memory facility and storing the same data in parallel in the memory facilities of the channels;
    calculating a first check value for data in a sub-region of a first memory facility;
    calculating a second check value for the same data in a sub-region of a second memory facility;
    comparing the first and second check values with one another;
    comparing at least one of the first check value or the second check value with an old check value, if the first and second check values are different;

replacing the data in the sub-region of the first memory facility with the data in the sub-region of the second memory facility, if the second check value corresponds to an old check value; and replacing the data in the sub-region of the second memory facility with the data in the sub-region of the first memory facility, if the first check value corresponds to an old check value.

2. The method according to claim 1, which further comprises determining the check values by using a cyclic redundancy check CRC or CRC32 or a hash calculation.

3. The method according to claim 1, which further comprises performing the method independently for a plurality of sub-regions of the memory facilities.

4. The method according to claim 1, which further comprises repeating the method cyclically and, if the first check value and the second check value are the same in a current cycle, storing the first check value and the second check value as an old first check value and an old second check value for the next cycle.

5. The method according to claim 1, which further comprises providing a memory size of the sub-regions as less than 5% of an available memory size of the memory facilities.

6. The method according to claim 1, which further comprises providing a memory size of the sub-regions as less than 1% of an available memory size of the memory facilities.

7. The method according to claim 1, which further comprises storing the old check value in at least one of a check value memory of the first memory facility or a check value memory of the second memory facility.

8. A secure, multi-channel computer for a railway system, the computer comprising:

at least one memory facility per channel for synchronous storage of data;

the computer configured to carry out the method according to claim 1.

9. The computer according to claim 8, wherein the computer is part of a signal facility.

10. A non-transitory computer program product with program instructions stored thereon that when executed by a computer, carry out the method according to claim 1.

11. A non-transitory computer-readable medium with instructions stored thereon, that when executed by a processor, carry out the method according to claim 1.

* * * * *